(12) United States Patent
Brix et al.

(10) Patent No.: US 10,897,886 B2
(45) Date of Patent: Jan. 26, 2021

(54) SYSTEM AND METHOD FOR CONVEYING AN AGRICULTURAL FORMULATION

(71) Applicant: BASF SE, Ludwigshafen am Rhein (DE)

(72) Inventors: Horst Dieter Brix, Limburgerhof (DE); Harald Kroeger, Limburgerhof (DE); Heinz-Gerd Wegkamp, Limburgerhof (DE); Wolf-Dieter Wichmann, Neetzow (DE)

(73) Assignee: BASF SE, Ludwigshafen (DE)

( * ) Notice: Subject to any disclaimer, the term of this patent is extended or adjusted under 35 U.S.C. 154(b) by 212 days.

(21) Appl. No.: 16/311,875

(22) PCT Filed: Jun. 21, 2017

(86) PCT No.: PCT/EP2017/065312
§ 371 (c)(1),
(2) Date: Dec. 20, 2018

(87) PCT Pub. No.: WO2017/220694
PCT Pub. Date: Dec. 28, 2017

(65) Prior Publication Data
US 2019/0200599 A1    Jul. 4, 2019

(30) Foreign Application Priority Data

Jun. 24, 2016  (EP) .................................... 16176157

(51) Int. Cl.
*A01M 7/00* (2006.01)
*B05B 7/24* (2006.01)
(Continued)

(52) U.S. Cl.
CPC ......... *A01M 7/0092* (2013.01); *B05B 7/2486* (2013.01); *B05B 7/32* (2013.01); *A01N 25/22* (2013.01)

(58) Field of Classification Search
CPC ...... A01M 7/0092; B05B 7/2486; B05B 7/32; B05B 9/0426; A01N 25/22; F15B 1/26;
(Continued)

(56) References Cited

U.S. PATENT DOCUMENTS 2,889,084 A * 6/1959 Tour ........................ B05B 9/085
222/334
8,235,256 B2 * 8/2012 Green ................... B05C 17/015
222/389

(Continued)

FOREIGN PATENT DOCUMENTS

WO    13083608 A1    6/2013
WO    13087103 A1    6/2013

OTHER PUBLICATIONS

Hk Hydraulik GmbH: "Infos zu Hydraulikfluessigkeiten, Hydraulikoel, Hydraulikfluid (Information on Hydraulic Liquids, Hydraulic Oil, Hydraulic Fluid)," https://www.hk-hydraulik.com/de/hydrauliklexikon/hydraulik-fluide.

(Continued)

*Primary Examiner* — Paul R Durand
*Assistant Examiner* — Robert K Nichols, II
(74) *Attorney, Agent, or Firm* — Marshall, Gerstein & Borun LLP

(57) ABSTRACT

The present invention relates to a system for delivering an agricultural formulation, having a container (1) for holding the agricultural formulation, the container (1) having a removal opening (19), a delivery unit (2), securely fastened in or to the container (1), for delivering the agricultural formulation located in the container (1) through the removal opening (19). The system also comprises a drive unit which, in order to drive the delivery unit (2), separately from the delivery unit (2), is coupled detachably to the delivery unit (2), wherein the drive unit has a hydraulic unit (12), which comprises a cylinder chamber (9), a piston (20) that is (Continued)

Figure 1:
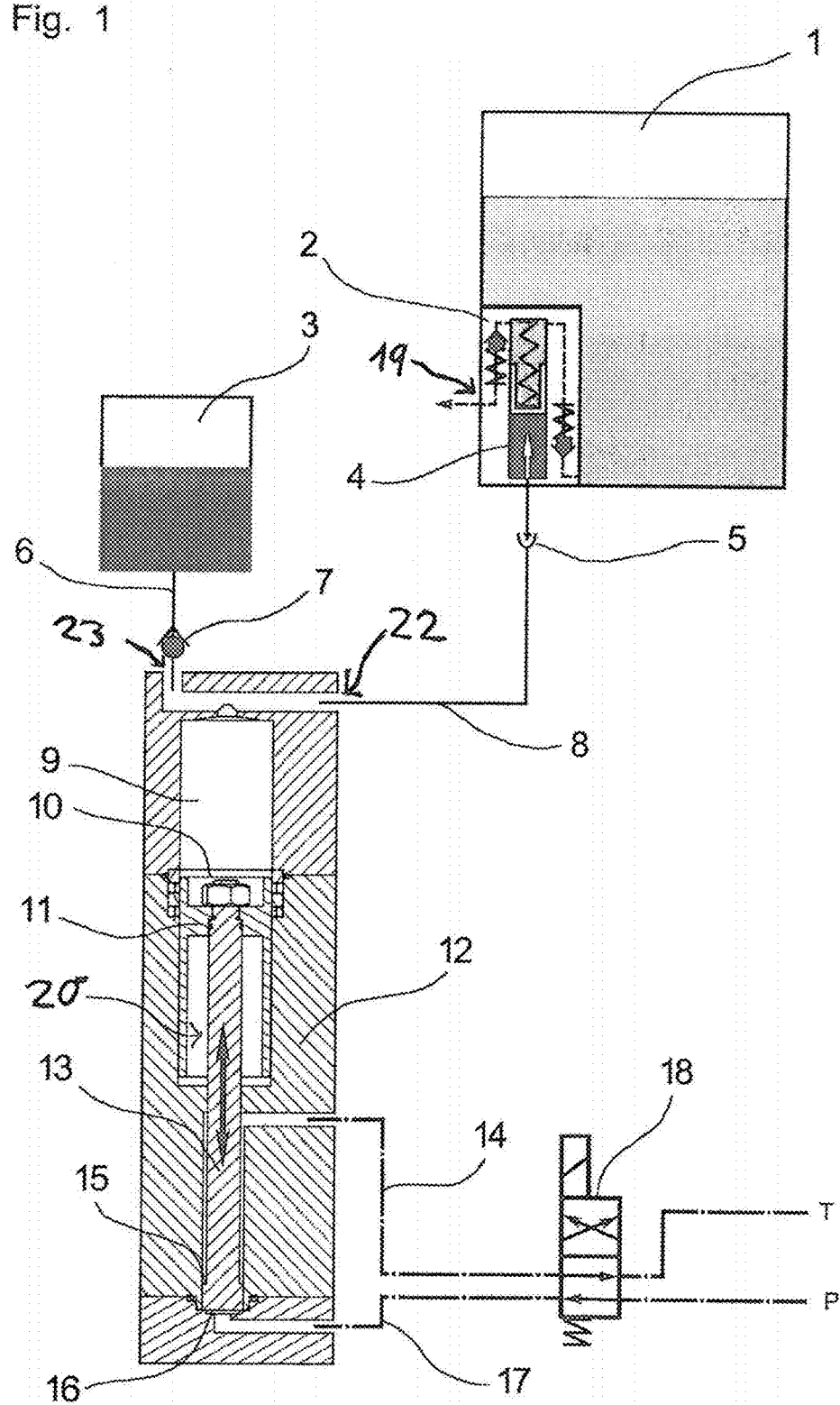

movable back and forth in the cylinder chamber (9), and an outlet opening (22) for a hydraulic fluid, and has a hydraulic line (8) which is coupled to the outlet opening (22) and able to be coupled to the delivery unit (2). In the system according to the invention, the hydraulic fluid is water or rapidly biodegradable. Furthermore, the hydraulic unit has a further cylinder chamber for driving the piston by means of a further hydraulic fluid. The invention also relates to a method for delivering an agricultural formulation.

11 Claims, 2 Drawing Sheets

(51) Int. Cl.
  *B05B 7/32* (2006.01)
  *A01N 25/22* (2006.01)
(58) Field of Classification Search
  CPC .. F15B 15/1428; F15B 11/032; B05C 17/015; A61M 5/14526; A61M 5/2053; A61B 17/8822; F04B 9/105; F04B 9/1056; F04B 19/22; F16N 25/02; G01F 11/04
  USPC .......... 222/401, 389, 334, 249; 92/179, 216, 92/219, 221, 152, 175
  See application file for complete search history.

(56) References Cited

U.S. PATENT DOCUMENTS

| 2014/0346248 A1* | 11/2014 | Huber | B05B 12/08 239/71 |
|---|---|---|---|
| 2015/0351376 A1 | 12/2015 | Wichmann | |

OTHER PUBLICATIONS

International Preliminary Report on Patentability, issued in PCT/EP2017/065312, dated Dec. 25, 2018.
International Search Report, issued in PCT/EP2017/065312, dated Oct. 5, 2017.

* cited by examiner

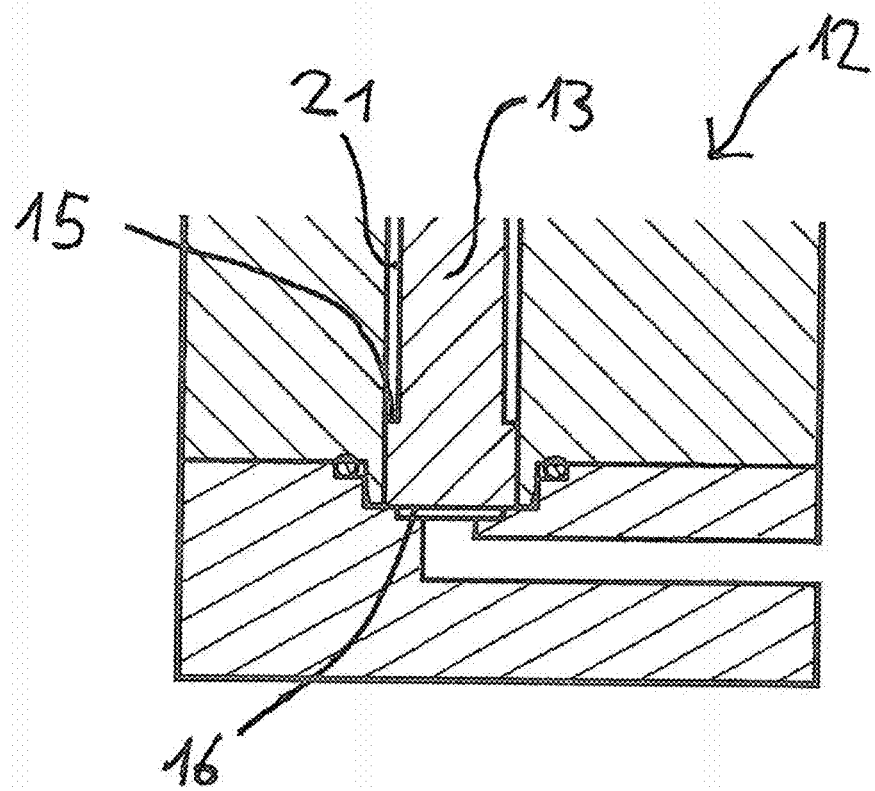

SYSTEM AND METHOD FOR CONVEYING AN AGRICULTURAL FORMULATION

This application is a National Stage application of International Application No. PCT/EP2017/065312, filed Jun. 21, 2017. This application also claims priority under 35 U.S.C. § 119 to European Patent Application No. 16176157.2, filed Jun. 24, 2016.

DESCRIPTION

The present invention relates to a system for delivering an agricultural formulation. The system comprises a container for holding the agricultural formulation, the container having a removal opening. The system also comprises a delivery unit, securely fastened in or to the container, for delivering the agricultural formulation located in the container through the removal opening. Furthermore, the system comprises a drive unit which, in order to drive the delivery unit, separately from the delivery unit, is coupled detachably to the delivery unit. The drive unit has a hydraulic unit and a hydraulic line. The hydraulic unit comprises a cylinder chamber, a piston that is movable back and forth in the cylinder chamber, and an outlet opening for a hydraulic fluid. The hydraulic line is coupled to the outlet opening of the hydraulic unit and able to be coupled to the delivery unit. Furthermore, the invention relates to a method for delivering an agricultural formulation and to the use of the system for delivering an agricultural formulation.

It is a known procedure to remove agricultural formulations from relatively large containers by means of a pump. The removal opening is, for this purpose, connected to a delivery unit, for example a pump, via a hose, said pump extracting the formulation located in the interior of the container by suction from the outside.

A drawback with such a system is that those parts of the delivery unit that come into contact with the agricultural formulation may have already been used in conjunction with containers which contained a different agricultural formulation. In this case, there is a risk of contamination of the agricultural formulation with a different agricultural formulation or other residues in the delivery unit when the formulation is removed through the delivery unit. Such contamination should absolutely be avoided, however.

In order to solve this problem, WO 2013/083608 A1 discloses a removal device in which the delivery unit is arranged in the interior of the container such that, by means of the delivery unit, a crop protection agent present in the container is able to be delivered out of the container through the removal opening of the container. Furthermore, the drive unit is arranged outside the interior of the container. This drive unit drives the delivery unit located in the interior of the container from the outside. As a result of the integration of the delivery unit in the container, contamination of the crop protection agent upon removal by means of the delivery unit is prevented, since the delivery unit is not used in conjunction with other crop protection agent containers. By contrast, the drive unit is coupled detachably to the delivery unit, such that it can also be used with other containers.

The delivery unit arranged in the interior of the container can in this case be driven by a mechanical movement or hydraulically.

WO 2013/087103 A1 discloses a system for dispensing liquid mixtures, which comprises a container with a metering pump for delivering the liquid located in the container, and a drive unit which is coupled releasably to the metering pump in order to drive the metering pump. In that case, the drive unit can drive the metering pump hydraulically.

Since, however, in the case of a hydraulic drive, the drive unit can be coupled to and uncoupled from the delivery unit, the problem arises that leaks of hydraulic fluid can occur. When the system is used in agriculture, such leaks are disadvantageous when environmentally harmful hydraulic oil escapes and passes into the environment.

Therefore, it is the object of the invention to provide a system and a method which avoid environmentally harmful contamination when the system or the method is operated to deliver the agricultural formulation.

According to the invention, this object is achieved by a system having the features of claim 1 and by a method having the features of claim 10. Advantageous configurations and developments can be gathered from the dependent claims.

Accordingly, in the system according to the invention, the hydraulic fluid is water or is rapidly biodegradable. Furthermore, in the system according to the invention, the hydraulic unit has a further cylinder chamber which is connected to at least one further hydraulic line, via which a further hydraulic fluid for moving the piston back and forth is able to be introduced into the cylinder chamber. For this purpose, the piston is formed in two parts, the first piston part having a first hydraulic piston surface that delimits the cylinder chamber, and the second piston part having at least one further hydraulic piston surface, on which a pressure is able to be exerted by means of the further hydraulic fluid, such that, by means of the further hydraulic fluid, the second piston part is movable in the further cylinder chamber.

Within the meaning of the invention, a rapidly biodegradable hydraulic fluid is understood to be in particular an environmentally friendly hydraulic fluid. Known, for example, are food grade hydraulic fluids which are based on very pure petrochemical white oil. Furthermore, rapidly biodegradable hydraulic fluids for use in biologically critical environments, such as water protection areas, forests or mountains, are known. Such hydraulic fluids are based for example on vegetable oils. They can also be produced on the basis of polyglycols or synthetic esters.

In the system according to the invention, a moving piston thus exerts a pressure on a hydraulic fluid in the cylinder chamber of the hydraulic unit, said pressure being transmitted to the delivery unit via the hydraulic line. The delivery unit, which is fastened in or to the container for holding the agricultural formulation, can be driven in this way. If, when the drive unit is detached from the delivery unit, hydraulic fluid passes into the environment, this advantageously has no environmentally harmful effects, since the hydraulic fluid is water or is rapidly biodegradable. The environmentally harmful effects of escaping hydraulic oil can be prevented in this way.

Water is not usually used as hydraulic fluid. The reason for this is the very low viscosity of water, which is very difficult to seal without elastic sealing elements. Moreover, water tends to take up air and toward cavitation. Both of these can make water compressible, this being disadvantageous when it is used as a hydraulic fluid. Contact with water also promotes corrosion. Finally, water freezes at temperatures of 0° degrees and below.

Surprisingly, it has been found that, in the system for delivering the agricultural formulation, when the delivery unit is driven hydraulically, water can be used as hydraulic fluid without the above-described drawbacks negatively affecting the driving of the delivery unit to deliver the agricultural formulation.

In the hydraulic line, it is possible for example for a coupling, in particular what is known as a quick coupling system, to be arranged. Via this coupling, or this quick coupling system, the drive unit is connectable to the delivery unit or detachable from the delivery unit. Such a coupling in the hydraulic line allows the user to couple the container with the delivery unit fastened therein or thereto quickly and easily to the separate drive unit.

According to one configuration of the system according to the invention, the further hydraulic piston surface of the second piston part has a second and a third hydraulic piston surface which are oppositely oriented and on which a pressure is able to be exerted alternately by means of the further hydraulic fluid, such that, by means of the further hydraulic fluid, the second piston part is movable back and forth in the further cylinder chamber.

The second and the third hydraulic piston surface are oppositely oriented at least such that they have normals which have at least components that are oppositely oriented. Therefore, in the system according to the invention, the second piston part is moved back and forth in the further cylinder chamber by means of the further hydraulic fluid. Since the first piston part is securely connected to the second piston part, the first piston part is moved back and forth in the cylinder chamber. There, the first hydraulic piston surface exerts a pressure on the hydraulic fluid during a movement which reduces the volume of the cylinder chamber. In this way, hydraulic fluid is pushed through the hydraulic line in the direction of the delivery unit of the container, with the result that the delivery unit is driven.

According to one configuration of the system according to the invention, the further hydraulic fluid differs from the hydraulic fluid mentioned first above, which drives the delivery unit. The further hydraulic fluid is in particular a hydraulic oil. By means of the hydraulic unit, in the system according to the invention, a transition from conventional oil-hydraulic driving with a hydraulic fluid, which should not pass into the environment, to water-hydraulic driving or hydraulic driving with a rapidly biodegradable hydraulic fluid is thus created.

The system may furthermore comprise a hydraulic valve, via which the further hydraulic fluid is able to be fed to the hydraulic unit via the at least one further hydraulic line. The hydraulic valve and/or the hydraulic unit are in particular securely connected to a carrier vehicle, for example an agricultural tractor. In this way, the oil hydraulics, usually already arranged in a carrier vehicle, for driving the delivery unit coupled in or to the container for the agricultural formulation can be used without the coupling and uncoupling of the hydraulic drive unit to and from the delivery unit resulting in the risk of environmentally harmful hydraulic fluid passing into the environment.

The delivery unit is in particular a hydraulically driven piston metering pump. This piston metering pump is driven directly by the hydraulic fluid. Such direct hydraulic driving of the piston metering pump should be understood as meaning that a piston of the piston metering pump has an active surface for delivering the medium to be metered, i.e. in the present case the agricultural formulation, on one side in a cylinder, and has one or more active surfaces for hydraulic driving with water or a rapidly biodegradable hydraulic fluid on the other side. This direct hydraulic driving has the advantage that no further mechanical components apart from the piston are required in the cylinder. By means of the piston metering pump, the agricultural formulation can be not only delivered but also metered.

In the system according to the invention, it is advantageously possible to convert a hydraulic unit operated with the oil-hydraulic driving of the carrier vehicle into water-hydraulic driving of the piston metering pump of the container for the agricultural formulation. In the process, hydraulic pressure pulses for driving the piston metering pump are created by water as hydraulic fluid.

By means of the piston metering pump, the agricultural formulation can be metered for example into the water stream of a crop protection device. An advantage of the use of a piston metering pump in or on the container for the agricultural formulation is that the parameters of the piston metering pump can be coordinated exactly with the properties of the agricultural formulation to be metered. In this way, the technical demands placed on the piston metering pump are reduced.

The driving of the piston of the hydraulic unit can alternatively take place mechanically, electrically or pneumatically. Electric driving can take place for example via an electric motor and/or electric valves. Mechanical driving can take place for example via the PTO shaft of a carrier vehicle. Pneumatic driving can be realized via a compressed air system, already present, of the carrier vehicle.

According to one development of the system according to the invention, the hydraulic line is fluidically connected to a filler valve, via which hydraulic fluid is able to be introduced into the hydraulic line. The filler valve is in particular a nonreturn valve without a spring reset.

The filler valve is in particular arranged such that it opens when the piston does not exert any pressure on the hydraulic fluid to drive the delivery unit, i.e. when the piston moves back in the cylinder chamber. When, by contrast, a pressure for driving the delivery unit is exerted on the hydraulic fluid in the hydraulic line by means of the hydraulic unit, the filler valve is closed in particular automatically. This arrangement prevents a negative pressure from forming in the hydraulic line and air from passing into the hydraulic line as a result. Specifically, with the filler valve open, it is possible for hydraulic fluid to pass into the hydraulic line. If, for example, hydraulic fluid has leaked into the environment during the coupling of the drive unit to the delivery unit, or the uncoupling thereof therefrom, such a leak can be compensated automatically by means of the filler valve.

According to yet another development of the system according to the invention, the filler valve is arranged at the highest point of the hydraulic line. In this case, the hydraulic line is configured such that air contained in the hydraulic line can rise upward and escape through the open filler valve. This avoids a situation in which the hydraulic fluid, i.e. in particular the water, takes up air possibly contained in the hydraulic line and thus has a negative effect on the properties of the water as hydraulic fluid.

In the system according to the invention, it is possible in particular for an ejection device to be fitted at the removal opening of the container. This ejection device may be for example a spray gun, via which the agricultural formulation can be sprayed out. The ejection device comprises an input opening and an ejection opening. It is possible for example for a suitable nozzle to be provided at the ejection opening.

In the method according to the invention for delivering an agricultural formulation, a piston is moved in a cylinder chamber of a hydraulic unit and as a result a pressure is exerted on a hydraulic fluid. In this case, the hydraulic fluid is rapidly biodegradable or is water. The hydraulic fluid transmits the exerted pressure via a hydraulic line connected to the cylinder chamber to a delivery unit arranged separately from the hydraulic unit. In this case, the hydraulic unit is connectable to the delivery unit and detachable from the delivery unit, the delivery unit being securely fastened in or to a container which holds the agricultural formulation. In the method according to the invention, the piston is driven by a further hydraulic fluid. The delivery unit is in turn driven by the pressure transmitted by the hydraulic fluid, such that it delivers the agricultural formulation out through a removal opening of the container.

The method according to the invention can be carried out in particular by the above-described system according to the invention. It therefore has the same advantages.

In the method according to the invention, the further hydraulic fluid may be for example a hydraulic oil.

The agricultural formulation contains in particular a crop protection agent.

The present invention also relates to the use of the above-described system to deliver an agricultural formulation which contains a crop protection agent. The system according to the invention may be used for example in conjunction with liquid crop protection agents which are formulated as EC, EW, SC, ME, SE, SL or OD. These formulation types are familiar to a person skilled in the art and described for example in H. Mollet, A. Grubenmann "Formulation Technology", WILEY-VCH, Weinheim 2001, pp. 389-397 and literature cited therein.

A person skilled in the art will understand an EC to be a liquid crop protection agent formulation in which the crop protection active ingredient(s) is/are in the form of a homogeneous solution in an organic solvent or solvent mixture that is immiscible with water, the solution producing an emulsion upon dilution with water.

A person skilled in the art will understand an EW to be a liquid crop protection agent formulation in which the crop protection active ingredient(s) is/are in the form of an oil-in-water emulsion, at least one of the crop protection active ingredients being present in the oil droplets.

A person skilled in the art will understand an SC to be a liquid crop protection agent formulation in which the crop protection active ingredient(s) is/are in the form of solid, finely divided particles which are suspended in an aqueous coherent phase. These formulations are also referred to as suspension concentrates.

A person skilled in the art will understand an ME to be a liquid crop protection agent formulation in which the crop protection active ingredient(s) is/are in the form of a microemulsion, typically at least one of the crop protection active ingredients typically being present in a form dissolved in the organic phase.

A person skilled in the art will understand an OD to be a liquid crop protection agent formulation in which the crop protection active ingredient(s) is/are in the form of solid, finely divided particles which are suspended in a nonaqueous coherent phase. These formulations are also referred to as oil dispersion concentrates.

A person skilled in the art will understand an SL formulation to be a water-soluble, liquid concentrate of a sufficiently water-soluble active ingredient (i.e. the active ingredient is homogeneously dispersible in water at the desired application rate/concentration). The solubility can be increased by the formulation constituents, for example water-soluble organic solvents such as alkanols (ethanol, propanol, isopropanol), dimethyl formamide (DMF), dimethyl sulfoxide (DMSO), butyrolactone, diethylene glycol, but also be water-soluble surfactants (fatty alcohol ethoxylates, polyalkylene ether, sugar surfactants, anionic surfactants).

Some active ingredients, for example glyphosates, glufosinate, fosamine, imidazolinones and particular salts of aromatic carboxylic acids (dicamba, chloramben, tricamba, bispyribac, pyriminobac, pyrithiobac, aminopyralid, clopyralid, florpyrauxifen, halauxifen, picloram) and salts of phenylacetic acid compounds, phenylpropionic acid compounds and phenylbutanoic acid compounds (2,4-D, 4-CPA, 3,4-D, MCPA, 2,4,5-T, 2,4-DB, 3,4-DB, MCPB, dichloprop, mecoprop etc.), are even slightly water soluble.

A person skilled in the art will understand an SE to be a liquid crop protection agent formulation in which the crop protection active ingredient(s) is/are in the form of solid, finely divided particles which are suspended in a nonaqueous liquid phase, which for its part is emulsified in an aqueous phase. These formulations are also referred to as suspoelmulsion concentrates.

In addition to one or more, preferably organic crop protection agents and at least one aqueous or nonaqueous diluent, the abovementioned formulations generally contain at least one surface-active substance which is frequently selected from anionic and nonionic emulsifiers and from anionic and nonionic polymeric dispersing assistants and which serves to form stable suspensions or emulsions upon dilution of the formulation with water, and, in the case of multiphase liquid formulations such as EW, SC, ME, OD, SL or SE, to stabilize the phases. Optionally, the formulations contain what are referred to as adjuvants which improve the effectiveness of the crop protection agent(s). Furthermore, the formulations generally contain one or more additives, such as additives for modifying the rheological properties, antifreezes, colorants and biocides in the quantities that are usual for the particular formulation type.

The invention will now be explained on the basis of an exemplary embodiment with reference to the drawings.

FIG. 1 schematically shows the structure of an exemplary embodiment of the system according to the invention, and FIG. 2 shows a detail of the hydraulic unit shown in FIG. 1.

The system according to the invention comprises a container 1 which holds an agricultural formulation, in particular a crop protection agent. Integrated into the container 1 is a delivery unit 2 which, in this exemplary embodiment, is configured as a piston metering pump 2. The piston metering pump 2 has, in a manner known per se, a delivery piston 4 which is spring-loaded and which is movable back and forth in a cylinder chamber. During the movement of the delivery piston 4, crop protection agent is drawn in from the interior of the container 1 at the bottom and delivered to the outside through valves in the direction of a removal opening 19 of the container 1.

At the removal opening 19, it is possible for example for an ejection device (not shown), such as a spray gun, to be fitted, via which the crop protection agent is distributed on the field.

The piston metering pump 2 is driven via a drive unit. The latter is arranged separately from the piston metering pump 2 and can be coupled detachably to the piston metering pump 2. Provided for the detachable coupling of the drive unit to the piston metering pump 2 is a hydraulic line 8 having a coupling 5.

Furthermore, the drive unit comprises a hydraulic unit 12. The hydraulic unit 12 can hydraulically drive the delivery piston 4 of the piston metering pump 2, as is explained in the following:

The hydraulic unit 12 comprises a cylinder chamber 9 and a further cylinder chamber 21 (FIG. 2). The cylinder chamber 9 is also referred to as first cylinder chamber in the following and the further cylinder chamber 21 is also referred to as second cylinder chamber in the following. Furthermore, the hydraulic unit 12 comprises a piston 20, which is movable back and forth in the first and second cylinder chambers 9, 21, as is indicated by the arrow shown in FIG. 1.

The piston 20 is in two parts. The first piston part 11 moves in the first cylinder chamber 9, the second piston part 13 moves in the second cylinder chamber 21. Located in the first cylinder chamber 9 is a hydraulic fluid, specifically water or a rapidly biodegradable hydraulic fluid, which is also referred to as first hydraulic fluid in the following. Formed at the first piston part 11 is a piston surface 10 which bounds the first cylinder chamber 9 and via which a pressure can be exerted on the first hydraulic fluid which is located in the interior of the first cylinder chamber 9.

Located in the second cylinder chamber 21 is a further, or second, hydraulic fluid. This second hydraulic fluid is hydraulic oil in the exemplary embodiment described here. The second hydraulic fluid differs from the first hydraulic fluid in that it is not environmentally compatible and therefore should not pass into the environment during operation of the system. The first hydraulic fluid can pass into the environment during operation of the system without developing an environmentally harmful effect.

In the present exemplary embodiment, it is water. However, a rapidly biodegradable hydraulic fluid can also be used.

In the present exemplary embodiment, the piston 20 is driven by the second hydraulic fluid, i.e. set into a back-and-forth movement. For this purpose, the piston surfaces 15 and 16, which are oppositely oriented, are formed at the second piston part 13, which moves in the second cylinder chamber 21. The second piston part 13 subdivides the second cylinder chamber 21 into two separate regions. In this case, the piston surface 15 forms a boundary surface, oriented in one direction, of the one part of the second cylinder chamber 21, and the piston surface 16 forms a boundary surface, oriented in the opposite direction, of the other part of the second piston chamber 21. The one part of the second cylinder chamber 21 is coupled to a hydraulic line 14, the other part of the second cylinder chamber 21 is coupled to the hydraulic line 17. The hydraulic lines 14 and 17 are coupled to a hydraulic valve 18, via which the second hydraulic fluid is pressed alternately into the hydraulic line 14 and the hydraulic line 17. The second hydraulic fluid thus flows alternately into the second cylinder chamber 21 via the hydraulic line 14 and out of the second cylinder time cylinder chamber 21 via the hydraulic line 17 and then, after a switchover of the hydraulic valve, 18, the second hydraulic fluid flows into the second cylinder chamber 21 via the hydraulic line 17 and out of the second cylinder chamber 21 via the hydraulic line 14. When the second hydraulic fluid is pressed into the hydraulic line 17, a pressure is exerted on the hydraulic surface 16 and so the piston 20 is moved upward in the illustration according to FIG. 1. By contrast, when the second hydraulic fluid is pressed into the hydraulic line 14, a pressure is exerted on the hydraulic surface 15, and so the piston 20 is moved downward in the illustration according to FIG. 1.

When the piston 20 moves upward, the first hydraulic fluid is pressed out of the first cylinder chamber 9 through the outlet opening 22 of the hydraulic unit 12 and pressed into the hydraulic line 8. As a result, the delivery piston 4 of the piston metering pump 2 is moved counter to the force of a spring. During this movement of the delivery piston 4, the crop protection agent in the interior of the container 1 is aspirated and delivered out of the container 1 through the removal opening 19. The delivery volume of the hydraulic unit 12 is in this case somewhat larger than the drive volume of the piston metering pump 2. As a result, functional reliability is ensured under all possible conditions.

If, as a result of the hydraulic valve 18 being switched over, the piston 20 moves downward in the illustration according to FIG. 1 as a result of oil-hydraulic pressure on the piston surface 15, the first hydraulic fluid is sucked out of the cylinder chamber of the piston metering pump 2 from the first cylinder chamber 9 via the hydraulic line 8 and the coupling 5 and can flow back into the cylinder chamber 9 of the hydraulic units 12 in an unimpeded manner. This flow movement is supported by the force exerted by the spring of the piston metering pump 2.

In the alternative embodiment, the second piston part 13 has only one further hydraulic piston surface, for example the piston surface 16. In this case, the second hydraulic fluid exerts a force on the piston 20 such that the latter moves in the direction of a reduction in size of the first cylinder chamber 9, so that the first hydraulic fluid is pushed out of the first cylinder chamber 9 through the outlet opening 22. As soon as the second hydraulic fluid exerts no or less force on the piston 20 in this case, the piston 20 is moved back on account of the force exerted by the spring of the piston metering pump 2.

The hydraulic unit 12 thus generates oil-hydraulically driven, hydraulic drive pulses with water as first hydraulic fluid.

The hydraulic line 8 is furthermore fluidically connected to a filler valve 7. In the present exemplary embodiment, a line is provided in the hydraulic unit 12, said line connecting the second cylinder chamber 9 to the outlet opening 22 at which the hydraulic line 8 is fitted. Furthermore, this line is connected to a refill opening 23 at which the filler valve 7 is fitted. A storage container 3 is attached in turn to the filler valve 7 via a line 6. Located in the storage container 3 is the first hydraulic fluid, i.e. water in the present exemplary embodiment.

The filler valve 7 is a nonreturn valve without a spring reset. The filler valve is arranged in this case such that it closes when the piston surface 10 of the piston 20 exerts a pressure on the first hydraulic fluid such that the latter is pressed out of the first cylinder chamber 9 into the hydraulic line 8. When the piston 20 moves back, i.e. moves downward in the illustration according to FIG. 1, the first hydraulic fluid flows back into the enlarging first cylinder chamber 9 also in a manner driven by the pressure which is generated by the force of the spring of the piston metering pump 2. Under these pressure conditions, the filler valve 7 opens so as to prevent a negative pressure arising in the hydraulic line 8 and possibly air passing into the hydraulic line 8. With the filler valve 7 open, any loss of the first hydraulic fluid can be compensated in that the first hydraulic fluid flows from the storage container 3, via the filler valve 7, into the hydraulic line 8 or the first cylinder chamber 9.

If losses of the first hydraulic fluid thus arise, as a result of leaks, on the way from the first cylinder chamber 9 to the delivery piston 4 of the piston metering pump 2 via the hydraulic line 8 and the coupling 5, first hydraulic fluid is automatically drawn in from the storage container 3 via the filler valve 7 when the piston 20 moves back, i.e. moves downward in the illustration according to FIG. 1.

Moreover, the filler valve 7 also prevents negative pressures in the drive system for the piston metering pump 2 when water is used as hydraulic fluid and the temperature drops significantly.

The filler valve 7 furthermore effects the venting of the drive system for the piston metering pump 2. For this purpose, the filler valve 7 is arranged at the highest point of the hydraulic line 8. The hydraulic line 8, or the regions fluidically connected to the hydraulic line 8, is/are configured such that any contained air can rise upward and escape through the open filler valve 7. This venting is also ensured in that the filler valve 7 is in an open state when the piston 20 goes back, such that air can escape through the filler valve 7.

The hydraulic valve 18 and advantageously also the hydraulic unit 12 are securely connected to a carrier vehicle, for example an agricultural tractor, in the present exemplary embodiment. Furthermore, the filler valve 7 and the storage container 3 are in particular also securely connected to the carrier vehicle. In order to distribute a crop protection agent on the field, the container 1 is connected to the hydraulic line 8 via the coupling 5. After the crop protection agent has been emptied from the container 1, the latter can be detached from the hydraulic line 8 again via the coupling 5 and disposed of or refilled with crop protection agent.

In the following, an exemplary embodiment of the method according to the invention is described, which is operated with the above-described system for delivering an agricultural formulation, in particular a crop protection agent:

The container 1 filled with crop protection agent is coupled to the hydraulic line 8 via the coupling 5. The container 1 is in this case fastened to the carrier vehicle and connected to an ejection device at the removal opening. Via a hydraulic device of the carrier vehicle and the control of the hydraulic valve, the second hydraulic fluid, i.e. a conventional hydraulic oil, is now delivered alternately under high pressure alternately into the hydraulic line 14 and the hydraulic line 17. The second piston part 13 acts with its piston surfaces 16 and 15 in this case as a dual-acting piston rod which moves back and forth in the second cylinder chamber 21. During the movement in one direction, the volume of the first cylinder chamber 9 decreases, the piston surface 10 pressing the first hydraulic fluid out of the first cylinder chamber 9. With the valve filler valve 7 closed, it passes into the hydraulic line 8 and via the coupling 5 to the piston metering pump 2. At the piston metering pump 2, the delivery piston 4 is moved such that the crop protection agent is delivered out of the removal opening 19.

After the hydraulic valve 18 has been switched over, the piston 20 moves downward in the illustration according to FIG. 1 and sucks the first hydraulic fluid back into the first cylinder chamber 9, such that the delivery piston 4 of the piston metering pump 2 moves back. In this case, the filler valve 7 is open such that more of the first hydraulic fluid can flow out of the storage container 3 in order to compensate for any losses and at the same time air contained in the hydraulic line 8 or in the first cylinder chamber 9 can escape upward through the filler valve 7.

LIST OF REFERENCE SIGNS

1 Container
2 Delivery unit; Piston metering pump
3 Storage container
4 Drive cylinder
5 Coupling
6 Line
7 Filler valve
8 Hydraulic line
9 Cylinder chamber
10 Piston surface
11 First piston part
12 Hydraulic unit
13 Second piston part
14 Hydraulic line
15 Piston surface
16 Piston surface
17 Hydraulic line
18 Hydraulic valve
19 Removal opening
20 Piston
21 Further cylinder chamber
22 Outlet opening
23 Refill opening

The invention claimed is:

1. A system for delivering an agricultural formulation, having
  a container for holding the agricultural formulation, the container having a removal opening,
  a delivery unit, securely fastened in or to the container, for delivering the agricultural formulation located in the container through the removal opening, and
  a drive unit which, in order to drive the delivery unit, separately from the delivery unit, is coupled detachably to the delivery unit,
  wherein the drive unit has a hydraulic unit, which comprises a cylinder chamber, a piston that is movable back and forth in the cylinder chamber, and an outlet opening for a hydraulic fluid, and a hydraulic line which is coupled to the outlet opening and able to be coupled to the delivery unit,
  wherein
  the hydraulic fluid is water or rapidly biodegradable,
  the hydraulic unit has a further cylinder chamber, which is connected to at least one further hydraulic line, via which a further hydraulic fluid for moving the piston back and forth is able to be introduced into the further cylinder chamber,
  the piston is configured in two parts, the first piston part having a first hydraulic piston surface which bounds the cylinder chamber, and the second piston part having at least one further hydraulic piston surface on which a pressure is able to be exerted by means of the further hydraulic fluid, such that, by means of the further hydraulic fluid, the second piston part is movable in the further cylinder chamber.

2. The system of claim 1, wherein the further hydraulic piston surface of the second piston part has a second and a third hydraulic piston surface which are oppositely oriented and on which a pressure is able to be exerted alternately by means of the further hydraulic fluid, such that, by means of the further hydraulic fluid, the second piston part is movable back and forth in the further cylinder chamber.

3. The system of claim 1, wherein the system comprises a hydraulic valve, via which the further hydraulic fluid is able to be fed to the hydraulic unit via the at least one further hydraulic line.

4. The system of claim 3, wherein the hydraulic valve and/or the hydraulic unit is/are securely connected to a carrier vehicle.

5. The system of claim 1, wherein the delivery unit is a hydraulically driven piston metering pump.

6. The system of claim 1, wherein the hydraulic line is fluidly connected to a filler valve, via which hydraulic fluid is able to be introduced into the hydraulic line.

7. The system of claim 6, wherein the filler valve is a nonreturn valve without a spring reset.

8. The system of claim 6, wherein the filler valve is arranged such that it opens when the piston does not exert any pressure on the hydraulic fluid to drive the delivery unit.

9. The system of claim 6, wherein the filler valve is arranged at the highest point of the hydraulic line and the hydraulic line is configured such that air contained in the hydraulic line can rise upward and escape through the open filler valve.

10. A method for delivering an agricultural formulation, wherein
- a piston is moved in a cylinder chamber of a hydraulic unit and as a result a pressure is exerted on a hydraulic fluid, the hydraulic fluid being water or rapidly biodegradable,
- the hydraulic fluid transmits the exerted pressure via a hydraulic line connected to the cylinder chamber to a delivery unit arranged separately from the hydraulic unit, the hydraulic line being connectable to the delivery unit and being detachable from the delivery unit, and the delivery unit being securely fastened in or to a container which holds the agricultural formulation,
- the piston is driven by a further hydraulic fluid, and
- the delivery unit is driven by the pressure transmitted by the hydraulic fluid, such that it delivers the agricultural formulation out through a removal opening of the container.

11. The method of claim 10, wherein the agricultural formulation contains a crop protection agent.

* * * * *